United States Patent [19]

McLauchlan

[11] 3,986,541

[45] Oct. 19, 1976

[54] TREE CROSS-CUTTING BLADE

[75] Inventor: Thomas A. McLauchlan, Vancouver, Canada

[73] Assignee: Canadian Patents and Development Limited, Ottawa, Canada

[22] Filed: Feb. 24, 1975

[21] Appl. No.: 552,138

[30] Foreign Application Priority Data

Mar. 26, 1974 Canada............................. 195962

[52] U.S. Cl. ........................ 144/34 E; 144/34 R; 144/193 R
[51] Int. Cl.² .................. A01G 23/08; A47J 49/02
[58] Field of Search.......... 144/2 N, 2 Z, 3 D, 34 R, 144/34 E, 34 F, 309 AC, 312, 193 R, 193 A, 193 C, 193 D, 193 E, 3 K; 254/104

[56] References Cited
UNITED STATES PATENTS

| 3,424,211 | 1/1969 | Marine | 144/34 F |
| 3,720,249 | 3/1973 | Peltonen | 144/34 E |
| 3,817,303 | 6/1974 | Kantola et al. | 144/34 R |
| 3,837,382 | 9/1974 | Gaitten | 144/34 E |
| 3,888,287 | 6/1975 | Johnson | 144/34 E |

Primary Examiner—Othell M. Simpson
Assistant Examiner—W. D. Bray
Attorney, Agent, or Firm—Francis W. Lemon

[57] ABSTRACT

A tree cross-cutting blade has plurality of wedge-shaped ribs on the upper surface of and integral with the shear blade. The wedge-shaped ribs extend rearwardly from a bevelled cutting edge of the shear blade and distribute any splitting of the wood, due for example to a tree being frozen across the width of the tree and thus reduce the damage by splitting in a lengthwise direction along the tree. The wedge-shaped ribs may be curved, if the cutting blade cuts along an arcuate path, or straight if cutting is along a straight path. Two such tree cross-cutting blades may be used to cut a tree between them or one used to cut a tree against an anvil. If one is used to cut a tree against an anvil the shear blade may taper to increase in thickness away from the bevelled cutting edge to fell a tree in the cutting direction. The wedge-shaped ribs have pointed leading ends and are preferably triangular in cross-section.

4 Claims, 7 Drawing Figures

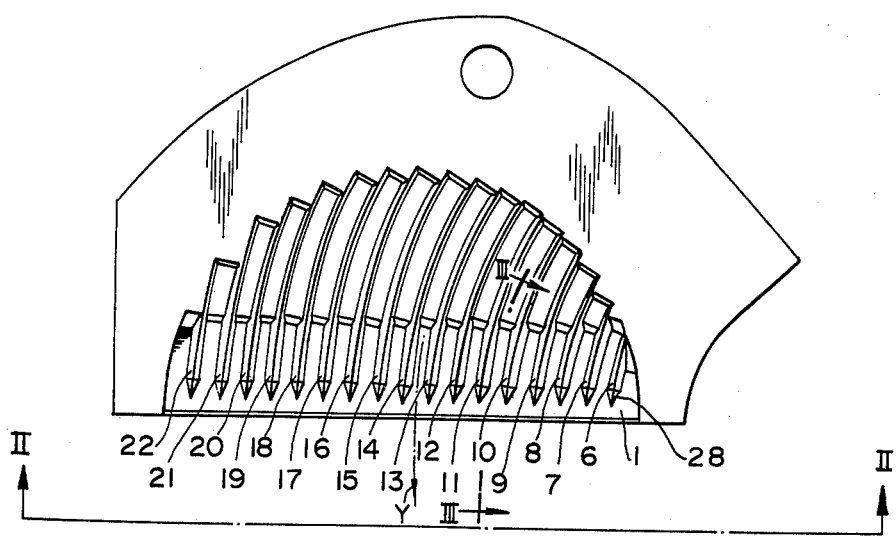
FIG. I
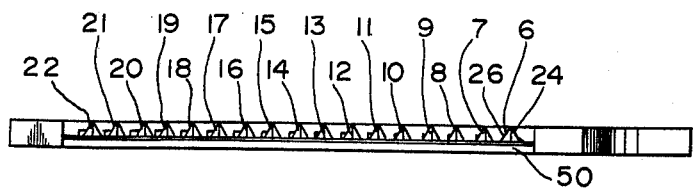
FIG. 2
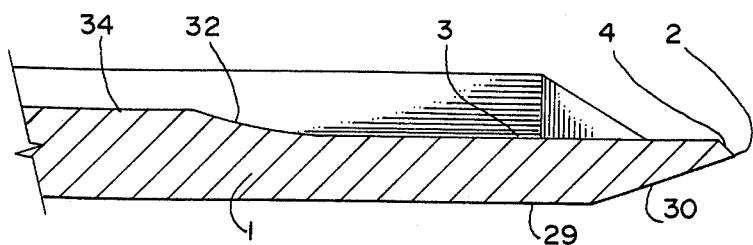
FIG. 3

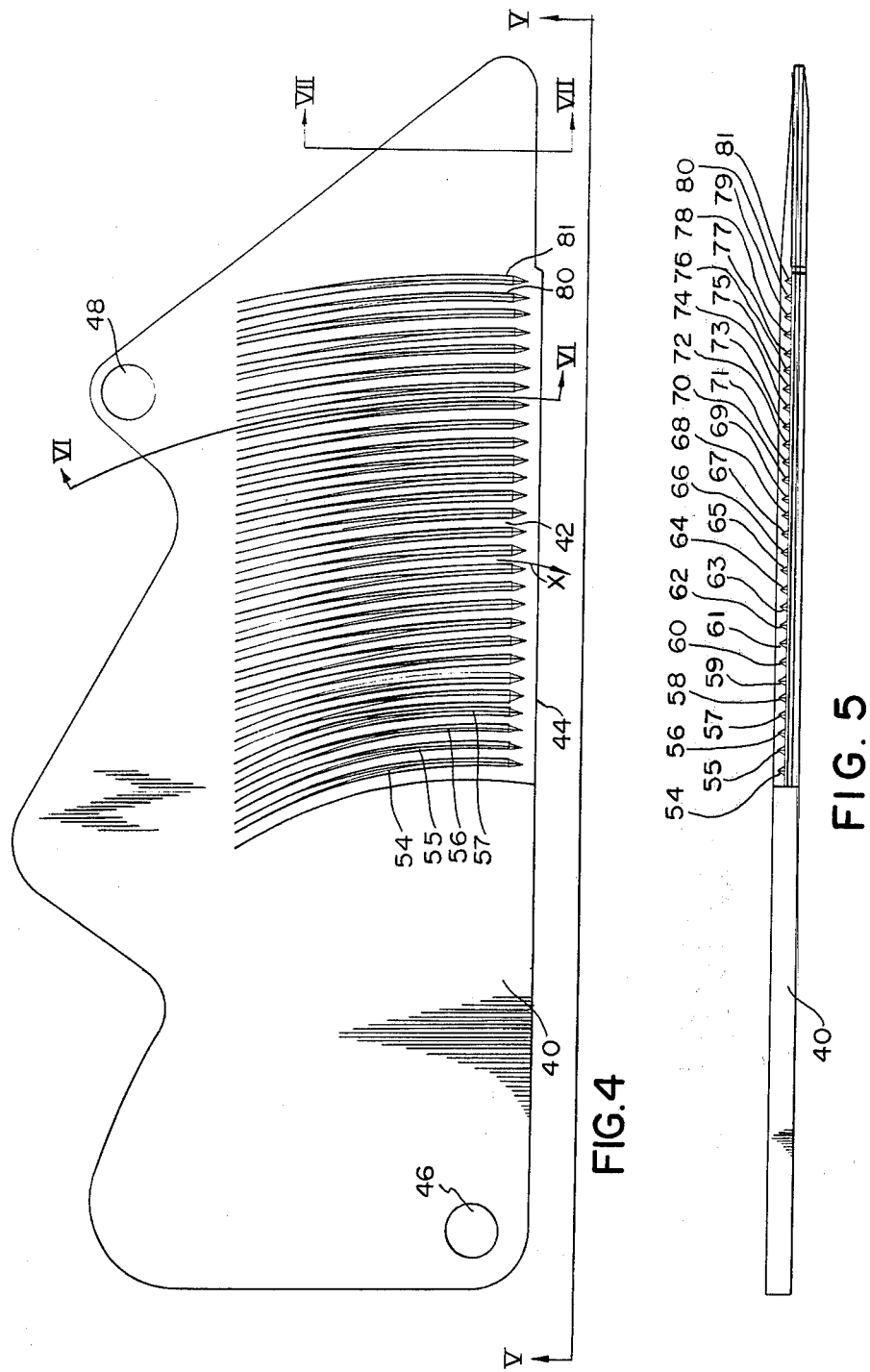

TREE CROSS-CUTTING BLADE

This invention relates to a tree cross-cutting blade.

Because it is difficult to find loggers to work in the woods, and for various economic reasons, mechanical tree fellers are being developed and used.

The simplest of these devices are tree shears, but the present tree cross-cutting blades of these tree shears cause excessive damage to the tree in the region of the cut, particularly when the trees are frozen.

It is an object of the present invention to provide a time cross-cutting blade wherein damage to the tree in the region of the cut is reduced, particularly when the trees are frozen. The present invention is most beneficial when the blade is only required to shear the tree, and is less beneficial if the blade is required to wedge the tree in the desired falling direction.

According to the present invention there is provided a tree cross-cutting blade, comprising a shear blade having a leading cutting edge which is bevelled on the upper surface, and a plurality of wedge-shaped ribs on the upper surface of and integral with the shear blade, the wedge-shaped ribs having inwardly sloping sides in an upward direction and having pointed leading ends and from the leading ends extending rearwardly along substantially parallel paths in the blade cutting direction from positions adjacent the leading, bevelled cutting edge.

Preferably the underside of the blade is bevelled at a much lesser angle than the upper surface at the leading, bevelled cutting edge.

In the accompanying drawings which illustrate, by way of example, embodiments of the present invention, FIG. 1 is a plan view of a tree cross-cutting blade for movement along an arcuate cutting path and intended for use as one of a matching pair.

FIG. 2 is an end view in the direction of II—II, FIG. 1.

FIG. 3 is a sectional side view along III—III, FIG. 1.

FIG. 4 is a plan view of a tree cross-cutting blade for movement along an arcuate cutting path and intended to be used as a single blade for wedging a tree in the felling direction.

FIG. 5 is an end view along V—V, FIG. 4.

Figure 6:
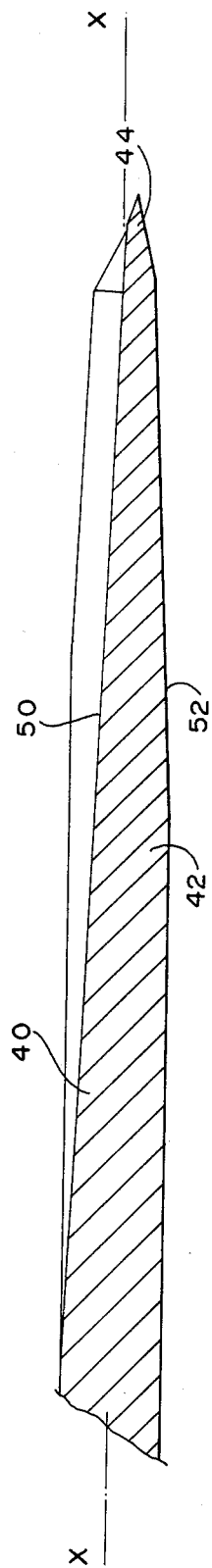
FIG. 6 is an enlarged sectional side view along VI—VI, FIG. 4, of a portion of the blade shown therein.

Referring to FIGS. 1 to 3, there is shown a tree cross-cutting blade, comprising a shear blade 1 having a leading cutting edge 2 which is bevelled or chamfered on the upper surface 3 at 4 (FIG. 3) preferably in the range 20° to 45° to the horizontal upper surface 3 of the shear blade 1, and a plurality of wedge-shaped ribs 6 to 22, that is, wedge-shaped in cross-section along the whole length, on the upper surface of and integral with the shear blade 50. The wedge-shaped ribs 6 to 22 have inwardly sloping sides in an upward direction, such as sides 24 and 26 of wedge-shaped rib 6 and have ridged, pointed leading ends which taper downwardly in height toward the leading cutting edge 2, such as pointed leading end 28 of wedge-shaped rib 6 and from the leading ends extend rearwardly along substantially parallel curved paths in the blade cutting direction & (FIG. 4) from positions adjacent the leading, bevelled cutting edge 2.

The underside 29 of the shear blade 1 preferably has a bevel 30 at the leading edge 2, and the bevel 30 preferably is at an angle in the range 14° to 20° to the underside 29 of the shear blade 1.

At positions spaced longitudinally along the wedge-shaped ribs 6 to 22 from their leading ends, the shear blade is preferably tapered at 32 to increase in thickness away from the leading, bevelled cutting edge 2 and then continue rearwardly of uniform thickness at 34.

The pointed leading ends of the wedge-shaped ribs 6 to 22, such as pointed leading end 78, are preferably triangular in cross-section.

Preferably the position 32, at which the shear blade 1 tapers in thickness between the wedge-shaped ribs 6 to 22, are staggered to sequentially contact the wood being cut, as will be described later.

In operation the tree cross-cutting blade 1 shown in FIGS. 1 to 3, and one which is a mirror image thereof, are mounted in a scissor-like mechanism of a tree feller and are used when the tree cross-cutting blades are not required to wedge the tree to control the felling direction. The shear blade 1 may be mounted in the scissor-like mechanism of a tree feller by welding along the rear periphery of the cross-cutting blade 1 or by bolting.

As an example of the size of the tree-cross-cutting blade 1 shown in FIGS. 1 to 3, the maximum length of the leading cutting edge 2 of a tested blade of this type was 19 inches, the width was 9½ inches and the portion of uniform thickness adjacent the leading cutting edge 2 was 7/16 inch thick. The portion 32 tapering in thickness tapered at an angle of approximately 15° to the upper surface 3, the portion 34 was ⅝ inch in thickness, and the wedge-shaped ribs 6 to 22 were 7/16 inch at the maximum height and had a base width of 7/16 inches at this height. The wedge-shaped ribs 6 to 22 were spaced across the shear blade 1 at a pitch of 1 inch, the pointed leading ends of the wedge-shaped ribs 6 to 22 each had a leading edge inclined at an angle of 30° to the upper surface 3, and as previously stated the chamfer or bevel at the upper surface 3 adjacent to the cutting edge was 20° to 45° to the horizontal upper surface 3. The bevel on the underside 29 was 18½° to the horizontal underside.

During tests a matched pair of tree cross-cutting blades having the above dimensions were attached to the jaws of a tree shear mounted on a crawler tractor and used to fell 78 Western white spruce trees having diameters in the ranges 7 inches–9 inches, 10 inches–12 inches and 13 inches to 15 inches at atmospheric temperatures of approximately 27° F. The tests indicated that trees 16 inches to 18 inches in diameter could be cut by these blades, however, snow compacted into ice around the perimeter of the blades between the tree being cut and the blade frame and prevented satisfactory tests being carried out on trees having diameters on this range.

The tree cross-cutting blades according to the present invention and having the above dimensions were compared with a matched pair of standard shear blades.

The evaluation of severity and depth of shearing splits was done by sawing 3 inch thick sections off butts of 18 test logs for each pair of blades until shearing damage disappeared. This evaluation of the shear blades showed that when compared to the standard straight blade, the ratio of the measure of split width or wood damage for the tree cross-cutting blades according to the present invention was 0.220. Essentially the same ratio was established for a mill evaluation of damage.

In the following Tables I and II giving results of the tests the tree cross cutting blades according to the present invention and having the above dimensions are referred to as ribbed shear blades.

The Table I is a detailed summary of the woods evaluation data for eighteen logs for each pair of blades, in which the average shear split width at each 3-inch interval, is listed for each severity of split and for each size class, and the total of these averages is used as an index of splitting damage.

The Table II shows that the ribbed shear blades caused the least amount of splitting for all diameter classes. There was little difference between classes.

reductions, in the loss of wood through splitting, shown in the Tables I and II.

Another advantage with tree cross-cutting blades according to the present invention is that the ribs 6 to 22 provide more stiffening than an equal amount of steel spread uniformly over the surface of the blade, hence for a shear blade 1 of a given stiffness the tree cross-cutting blades according to the present invention have a lesser average thickness than standard blades (as well as a much lesser apparent thickness) and so less wood is displaced as the shear blade 1 enters a tree trunk.

The wedge-shaped ribs 6 to 22 exert forces on the wood in perpendicular directions to their sloping sides and components of these forces tend to cause compression of the wood perpendicular to the grain. These

TABLE I

WOODS EVALUATION OF FELLING DAMAGE

| Butt Diameter Class | | Average Shear Split Width (In.)[1] | | | | | | | | Total |
|---|---|---|---|---|---|---|---|---|---|---|
| | | 7" – 9" | | | 10" – 12" | | | 13" – 15" | | |
| Severity of Splits[2] | | L | M | S | L | M | S | L | M | S | Width |
| | Depth of Split (In.) | | | | | | | | | |
| RIBBED SHEAR | 3" | 1 | 1 | 5 | 2 | 1 | 4 | 1 | 1 | 5 | 21 |
| Split | 6" | 1 | 1 | 2 | 1 | | | | | 1 | 6 |
| Length | 9" | 2 | | 1 | | | | | | | 3 |
| Inches | 12" | 1 | | | | | | | | | 1 |
| | 15" | | | | | | | | | | |
| | 18" | | | | | | | | | | |
| | 21" | | | | | | | | | | |
| | Total | 5 | 2 | 8 | 3 | 1 | 4 | 1 | 1 | 6 | 31 |
| STANDARD SHEAR | 3" | 6 | 5 | 10 | 5 | 8 | 12 | 15 | 5 | 15 | 81 |
| Split | 6" | 6 | 2 | 3 | 2 | 3 | 8 | 6 | 2 | 8 | 40 |
| Length | 9" | 1 | | 1 | 1 | 2 | 5 | 3 | 1 | 4 | 18 |
| Inches | 12" | | | 1 | 3 | 3 | | 1 | | 2 | 10 |
| | 15" | | | | 1 | | | | | 2 | 3 |
| | 18" | | | | | | | | | 2 | 2 |
| | 21" | | | | | | | | | | |
| | Total | 13 | 7 | 15 | 12 | 16 | 25 | 25 | 8 | 33 | 154 |

[1]An average of the total number of trees evaluated for each diameter class.
[2]L — Light: Fine, tight splits.
M — Moderate: Hairline splits with some open areas.
S — Severe: Open splits.

TABLE II

SUMMARY OF WOODS EVALUATION

| Felling Method | Total Average Split Width (Inches) by Diameter Class | | |
|---|---|---|---|
| | 7" – 9" | 10" – 12" | 13" – 15" |
| Ribbed Shear | 15 | 8 | 8 |
| Standard Shear | 35 | 53 | 66 |

Splitting caused by the standard shear blades increased with diameter and was greater than the ribbed shear blade.

The Tables I and II show that the ribbed shear blades are a significant improvement over standard shear blades.

It was noted from similar tests carried out with a chain saw that a chain saw provided the best volume recovery.

The tests showed that as the leading edge 2 of blade 1 cuts into the wood the pointed leading ends of the wedge-shaped ribs 6 to 22 contact and enter the wood so that the wedge-shaped ribs 6 to 22 cause minor fractures across the sheared region which permit the relief of major stresses within the wood and thus reduce the tendency of the wood to have any major splits running an undue length along the trunk, thus effecting the components are much more effective in compressing the wood than forces parallel to the grain that are generated by standard, parallel-faced blades. Consequently the tree shear blades according to the present invention can enter the wood more easily than standard blades.

The wedge-shaped ribs 6 to 22 originate a series of minor fractures in the wood and so reduce the tendency of major fractures being generated.

Referring now to FIGS. 4 to 7, there is shown a tree cross-cutting blade comprising a shear blade 40 and wedge-shaped ribs 54 to 81 and is for use as a single shear blade for movement toward a conventional fixed anvil (not shown). The cutting portion 42 of the shear blade 40 tapers in thickness continuously from the leading, bevelled cutting edge 44 in order to wedge a tree during cutting and cause the cut tree to fall in the cutting direction.

The shear blade 40 has pivot hole 46 for pivotally mounting the shear blade 40 in a conventional housing (not shown) by means of a pivot pin. A hydraulic piston pivot hole 48 is provided for pivotally attaching the shear blade 40 to a conventional hydraulic piston (not shown) for urging the shear blade 40 in the cutting direction X about the pivot hole 46.

The cutting portion 42 has an upper surface 50 tapering at an angle of 2°44' to the centerline of the shear blade 40, and an underside 52 tapering at an angle at 2°14' thereto.

The shear blade 40 has the twenty eight wedge-shaped ribs 54 to 81 on the upper surface 50 and integral with the shear blade 40. The leading ends of the ribs 54 to 81 are pointed and the points are inclined slightly towards the pivot hole 46 to pierce the wood in the cutting direction of the shear blade 40. Thus the point of rib 54 is inclined towards the pivot hole 46 at an angle of 5°4', the point of rib 61 at an angle of 3°51', the point of rib 69 at an angle of 3°6', and the point of rib 77 at an angle of 2°36'.

The leading, bevelled cutting edge 44 is bevelled on the upper surface, in front of the ribs 54 to 81, at an angle of 20° to the centerline XX of the shear blade 40, and is bevelled on the underside, for the whole length of the leading, bevelled cutting edge 44, at an angle of 14° to the centerline XX of the shear blade 40.

Figure 7:
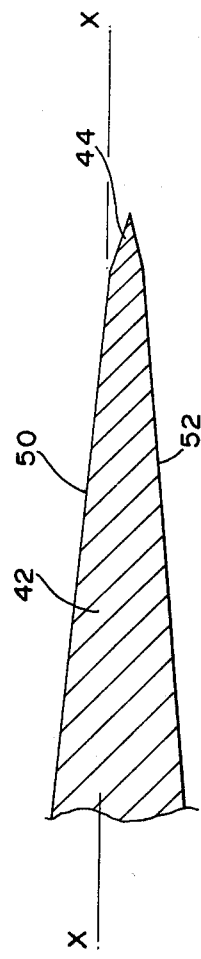
FIG. 7 is an enlarged sectional side view along VII—VII, FIG. 4.

The tip of the leading, bevelled cutting edge 44 is spaced 5/16 in. below the center of the cutting portion 42 in the region indicated by the sectional side view VI—VI, (FIG. 6) and ¼ in. below the center of the cutting portion 42 in the region indicated by the sectional side view VII—VII (FIG. 7). Beyond the wedge-shaped ridges 54 to 81 the leading, bevelled cutting edge 44 is bevelled on the upper surface at an angle of 14° to the centerline XX of the shear blade 40. The wedge-shaped ribs 54 to 81 are equilateral triangles in cross-section.

The tree cross-cutting blade shown in FIGS. 4 to 7 operates in a similar manner to the cross-cutting blade 1 in FIGS. 1 to 3, except that it cuts a tree between the shear blade 40 and a conventional, fixed anvil. The wedging action caused by the tapering thickness of the cutting portion 42 causes the tree to fall in the cutting direction of the cross-cutting blade.

The tip of the blade, i.e. the cutting section that has no ribs and that is farthest from the pivot point 46, is used mainly to make initial snips or cuts in trees that are too large for the shear mechanism. After such an initial cut it is much easier to remove this section of the blade from the tree without causing damage because it does not have ribs. The profile of the ribbed section, as shown at the right of FIG. 6 and including upper and lower bevels and rib tips, was designed so that the blade would not be urged upward or downward as it passed through the wood. During initial trials the tip of the blade had this same profile, but without the ribs, and it was urged upward so strongly by the wedging action that the extreme tip was bend upward approximately 3/16 inch. It was therefore desirable that the tip of the blade, between the ribbed section and the extremity, should have a more balanced or symmetrical profile as indicated in FIG. 7. This profile is not at all critical.

The fact that the wedging action of the shear blade 40 requires additional force to urge the tapered shear blade 40 into a tree, when compared with the force required to urge a cross-cutting blade of uniform thickness into a tree, reduces the desirable effect of limiting the splitting of the wood to some extent. However, a cross-cutting blade according to FIGS. 4 to 7, weighing approximately 500 pounds, when tested showed that butt shear damage was approximately 50% of that for conventional tree cross-cutting blades.

A ribbed, tree cross-cutting blade according to the present invention could be used that is advanced along a straight cutting path, instead of a curved cutting path, and in this case the wedge-shaped ribs would extend along straight paths from the cutting edge.

I claim:

1. A tree cross-cutting blade, comprising a shear blade having a leading cutting edge which is bevelled on the upper surface, and a plurality of ribs on the upper surface of and integral with the shear blade, the ribs being wedge-shaped in cross-section along the whole length by having inwardly sloping sides in an upward direction and ridged, pointed ends which taper downwardly in height toward the leading cutting edge, the ribs extending rearwardly along substantially parallel paths in the blade cutting direction from positions adjacent the leading, bevelled cutting edge.

2. A blade according to claim 1, wherein at positions spaced longitudinally along the ribs of wedge-shaped cross-section from their ridged, pointed ends the shear blade is tapered to increase in thickness away from the leading, bevelled cutting edge and then continues rearwardly of uniform thickness.

3. A blade according to claim 2, wherein the positions at which the blade is tapered to increase in thickness are staggered relative to one another in the longitudinal direction of the ribs of wedge-shaped cross-section to sequentially contact a piece of wood during cutting.

4. A blade according to claim 1, wherein the ridged, pointed ends and the wedge-shaped cross-sections of the ribs are triangular in cross-section.

* * * * *